Patented Apr. 2, 1940

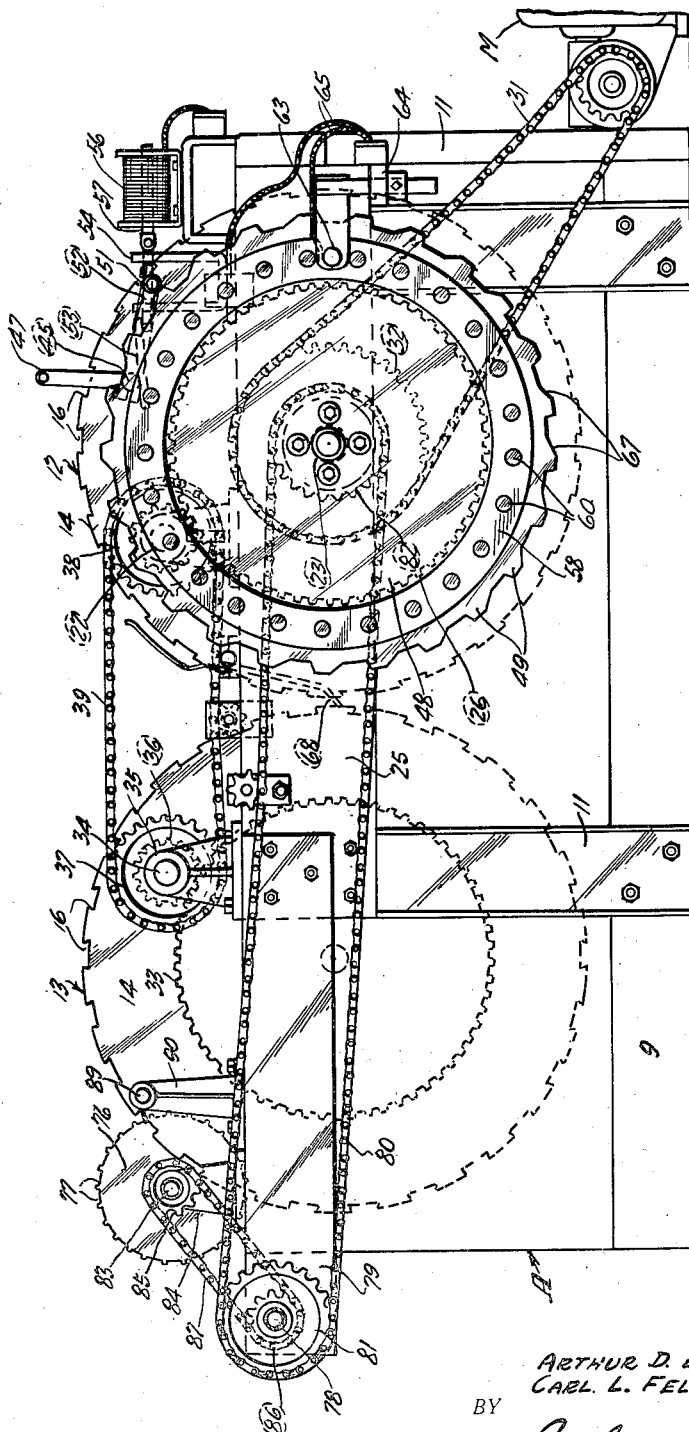

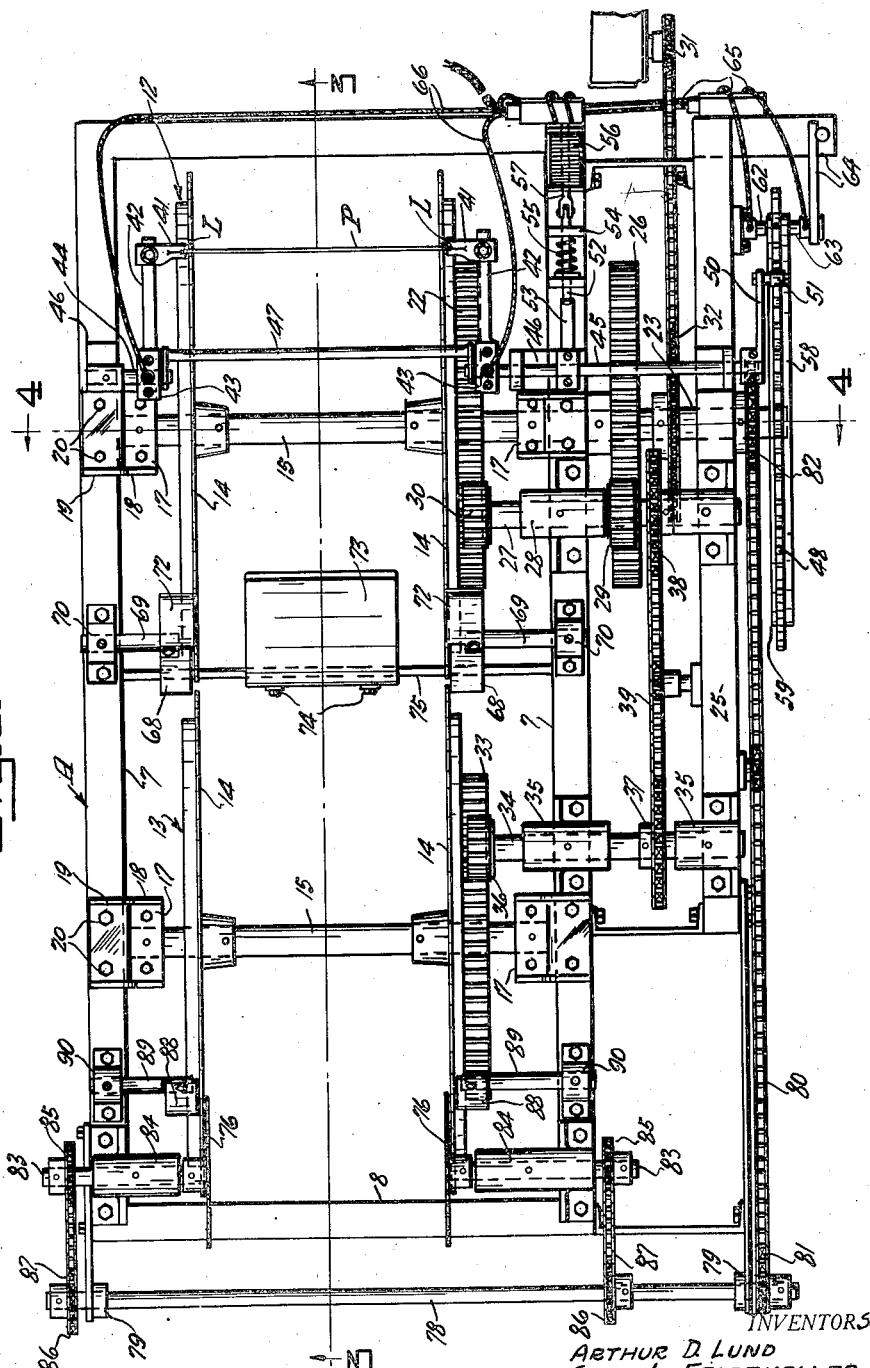

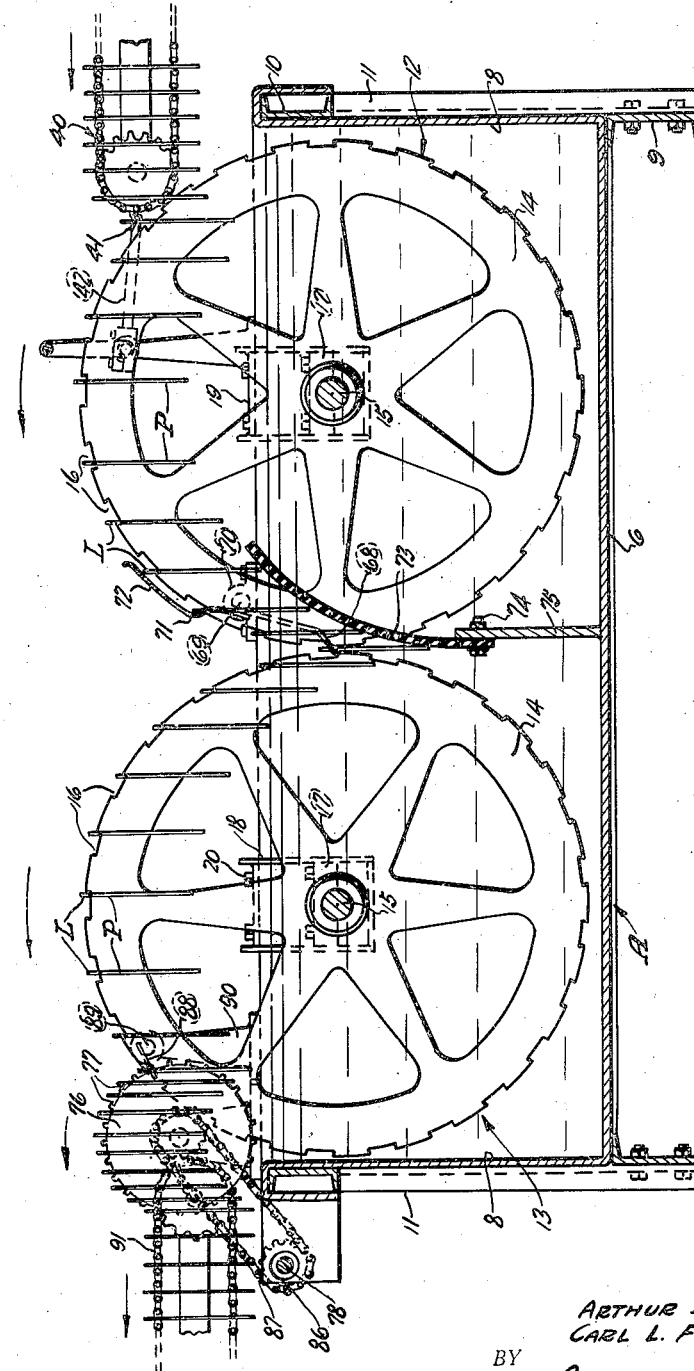

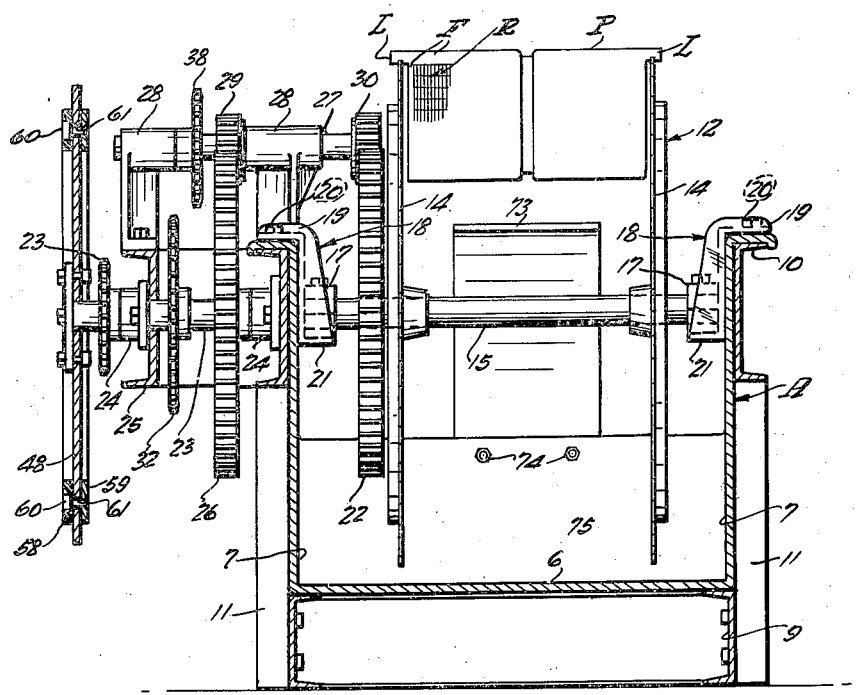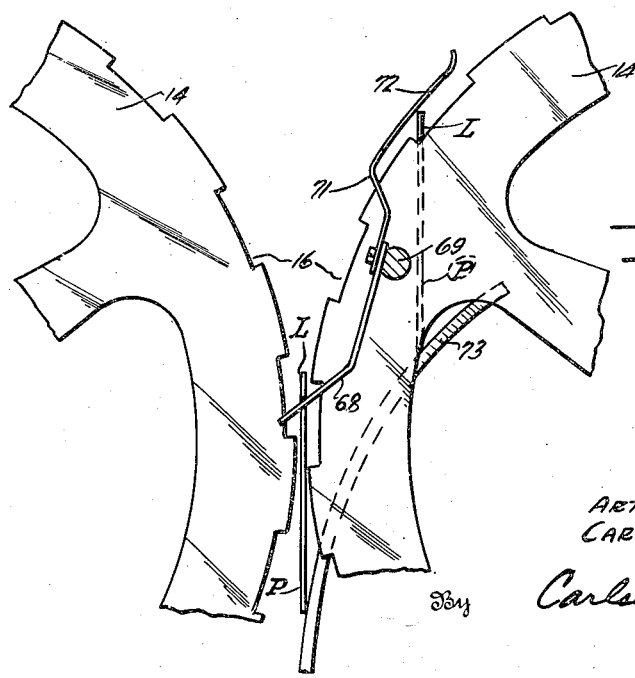

2,195,723

UNITED STATES PATENT OFFICE 2,195,723

BONDING MACHINE

Carl L. Feldtkeller, Milwaukee, Wis., and Arthur D. Lund, Minneapolis, Minn., assignors to Solar Corporation, Milwaukee, Wis., a corporation of Delaware Application February 2, 1939, Serial No. 254,334

14 Claims. (Cl. 214—17)

This invention relates to improvements in bonding machines for dipping storage battery grids.

In the manufacture of the grids used in the present day storage batteries they are first cast in the form of plates, each of which may be subsequently trimmed and cut to provide a number of completed grids, and these plates are formed with the usual "wires" and "ribs" which define the interstices for receiving the pasty active material. The cast plates are then pasted and are usually transported to an oven for baking, after which the plates are trimmed as described. However, it is found that a desirable result may be secured by dipping, or as it is termed "bonding," the pasted plates prior to their entrance into the oven, in an acid bath which apparently sulphates the paste surface and effectively prevents checking thereof, as would otherwise occur. Inasmuch as the operations of casting and pasting the plates in accordance with modern mass production practice are carried on entirely by continuously and rapidly operating machines, it is extremely desirable that the dipping or bonding operation be carried out in a like manner and that the machine performing this operation be arranged as a unit in the entire machine line or set up in order to handle the plates in proper order and deliver them to the oven.

Having in mind these facts, it is the primary object of our invention to provide a machine which will operate to take the pasted plates from the pasting machine, dip them into the acid solution, and then deliver them to the oven, and which will perform these operations rapidly and efficiently without interference with the normal output speed of the pasting machine.

Another object is to provide a bonding or dipping machine including members for carrying the plates into the acid and withdrawing them therefrom, and cooperating electrical means, under control both of the plates themselves and of the relative positions of said members, for positively registering the plates as they are received from the pasting machine and insuring that each plate reaches the carrying members at the proper time for travel through its cycle of operation and delivery to the oven.

Another object is to provide novel and effective automatically operating transport and transfer mechanism for the plates and by which they are carried through the entire dipping or bonding operation without attention on the part of the operator, said mechanism including in addition means for guiding the plates edgewise down into the acid to wholly immerse each plate without danger of its becoming dislodged or disarranged from its proper line of travel through the machine.

A further and important object is to provide for a machine of this kind a novel assembly of tank and operating mechanism wherein said mechanism, while necessarily disposed within said tank, is nevertheless hung or supported from the upper edge and outer portions thereof, in such manner that neither the walls nor the bottom of the tank need be perforated or otherwise injured. This feature is of importance in that it prevents acid seepage and corrosion of bearings and packings which might otherwise be used in said walls, and allows a sheet lead tank to be employed to best withstand the corrosive effects of the acid.

These and other more detailed and specific objects will be disclosed in the course of the following specification, reference being had to the accompanying drawings, in which—

Fig. 1 is a side elevation of our improved dipping or bonding machine.

Fig. 2 is a plan view thereof.

Fig. 3 is a vertical, longitudinal section along the line 3—3 in Fig. 2, showing the machine in operation with a series of battery grid plates going through the machine, this view also showing conveyors carrying the plates to and from the machine.

Fig. 4 is a vertical cross section along the line 4—4 in Fig. 2.

Fig. 5 is an enlarged, fragmentary side elevational view of the contiguous portions of the dipping members and the guide and transfer means associated therewith.

Referring now more particularly and by reference numerals to the drawings, A designates the dipping tank or receptacle which is of rectangular, open-topped form made up of the bottom 6, side walls 7, and end walls 8, all of sheet lead or similar material well adapted to resist the corrosive effects of the acid with which the tank is filled. The tank is supported upon a base frame 9, and at their upper margins the side and end walls 7 and 8 are turned outwardly over an upper frame 10 supported rigidly from the base by upright members 11. This frame assembly effectively braces and supports the tank and forms a rigid structure well adapted to support the various working and operating parts of the machine.

The battery plates, designated generally at P, are of the type cast in large quantities by casting machinery, as heretofore set forth, and comprise (see Fig. 4) the marginal frame F supporting the "wires" and "ribs" designated generally at R and which define the interstices for receiving the paste in the pasting machine. At each end lugs L extend from the plate, and these lugs are used in the present machine to support the plates as they move through the machine. When the plates are completely processed they are trimmed and each divided medially to form two completed grids, and the lugs L then serve as connectors for supporting the plates in the battery, as will be understood.

The plates are dipped and handled primarily by means of two reel-like carriers or dipping devices designated generally at 12 and 13, and each of which is of identical construction comprising a pair of flat circular disks or wheels 14 and a common shaft or axle 15 upon which the wheels are rigidly mounted. The wheels are notched around their peripheral margins as indicated at 16, and the wheels are so spaced on their respective axles that the plates P may hang freely between the wheels when supported by the lugs L in said notches 16, as in Figs. 3 and 4.

The two carrier devices thus formed are mounted in the tank so that the contiguous margins of each set of wheels just clear and so that the wheels may rotate freely in vertical planes parallel with the tank sides 7. For this purpose the axles 15 are extended endwise beyond the wheels, and are rotatably received in bearings 17 which are supported inside the tank sides by hangers or brackets 18. Said hangers are of substantially inverted L-shape, and have outwardly turned portions 19 which overlie the upper margins of the tank and are secured thereto by bolts or screws 20 so that the vertical portions of the hangers fit flatly against the tank sides without penetrating or otherwise injuring said sides. In this manner the difficulties due to acid seepage and corrosion usually encountered where the tank is pierced by the bearings, is entirely avoided. The hangers have inwardly turned rests 21 at the proper level, and it is upon these that the bearings 17 are actually secured.

The wheels are rotated continuously in the same direction and for this purpose a ring gear 22 is secured to the carrier 12 concentrically with respect to the axle 15 and upon the outer side of one of the wheels 14. A drive shaft 23 is journaled in bearings 24 on the adjacent side of the frame 10 and upon a frame bar 25 spaced and supported outwardly from this side of the frame so that the drive shaft is disposed in endwise or axial alignment with the axle 14 of the carrier provided with the ring gear. A drive gear 26 is secured upon the drive shaft 23 and an overdrive assembly comprising a countershaft 27 is supported in bearings 28 atop the margin of the tank and the frame bar 25 in such manner that pinions 29—30 secured on the countershaft may mesh with the ring gear and drive gear. A prime mover such as the electric motor M is connected by a sprocket chain 31 to a sprocket 32 on the drive shaft and rotates this shaft to correspondingly rotate the carrier 12 by means of the meshing gears and pinions described. A similar ring gear 33 is secured to carrier 13 upon the same side or end thereof, and a countershaft 34 is simlarly journaled in bearings 35 atop the tank side and frame bar to support the pinion 36 in mesh with this gear. Sprockets 37—38 on the respective countershafts 27 and 34 are then connected by a chain 39, and it will thus be apparent that both carriers will be driven at the same speed as the motor M operates.

A conveyor 40, of the usual chain type, transports the plates from the pasting machine (not shown) to the dipping machine, and the plates during this operation are supported by their lugs between the parallel chains of the conveyor to travel therewith toward and over the end of the tank A. This conveyor brings the plates to the carrier 12, hereinafter termed the input carrier, and to a point at an upper portion thereof where the wheels 14 are moving upwardly and inwardly away from the end of the tank. The plates may thus be successively dropped to hang by their lugs upon the receiving fingers 41, as shown in Fig. 3. These fingers 41 are supported at the outer ends of arms 42 which are oscillatable in a vertical plane outwardly of the wheels 14 by means of their connection at 43 with the shafts 44 and 45 journaled in bearings 46 on the tank. A yoke 47 connects the shafts 44 and 45 to cause them to operate in unison, and this yoke stands upwardly to substantially clear the carrier wheels. The fingers 41 are dished or slightly V-shaped as shown, in order to best support and center the lugs of the grid plates, and the extremities of said fingers just clear the outer sides of the carrier wheels 14, so that by lowering the fingers from their normal position (Fig. 3) above the wheels to a point below the adjacent margins thereof, the lugs of the plates will be lowered into hanging engagement with transversely aligned pairs of the notches 16, this being the purpose of the oscillatable mounting of the fingers.

It is, of course, necessary that the transfer of the plates to the wheels 14 be made at a time when a pair of the notches 16 are in line with the path of the descending fingers 41 so that the plate lugs will come properly to rest in the notches, and for the purpose of properly registering and regulating this transfer we provide the mechanism now to be described.

A cam disc 48 is secured to the outer end of the drive shaft 23 and has its peripheral margin provided with a series of equally spaced cam lugs or shoulders 49 equal in number to the notches 16 in the wheels 14, and which are disposed in certain definite relation to the radial position of said notches. The shaft 45 is extended to a position adjacent this cam disc and carries a rigidly mounted and radially extended lifter arm 50 on the end of which is carried a roller 51 adapted to ride the periphery of the disc, and by engagement with the lugs 49 and spaces therebetween cause an oscillating motion of the shaft and of the arms 42 carrying the fingers 41. The proper positioning of the cam disc 48 with reference to the carrier wheels will thus cause the fingers 41 to descend each time a notch 16 reaches proper position, and which intervals of course correspond with the dropping of the roller 51 into the space between two of the cam lugs 49. The parts are so distributed about the axes of the shafts 44 and 45 that the arms 42 will descend of their own weight as the operation of the cam and roller assembly permits.

The roller 51 is normally held in a position at which it just clears the lugs 49 as the cam disc rotates, this being accomplished by the movement of a latch member 52 beneath a short radial arm 53 secured to the shaft 45, and the fingers 41 are thus normally held in elevated receiving position as shown. However, by withdrawing the latch 52 from beneath the arm the cam action becomes effective at once, as will be evident.

The latch 52 is slidable in a bracket 54 secured atop the tank side, and is normally urged beneath said arm 53 by a coil spring 55. A solenoid 56 has its plunger 57 connected to the latch in such manner that the latch may be withdrawn when the solenoid is energized and the solenoid thus directly controls the operative condition of the registering mechanism. Control in turn of this solenoid is accomplished automatically with reference both to the position of the carrier wheels and the condition of the transfer fingers 41 (that is, whether these fingers are occupied by a plate or not), as will now be described.

Inner and outer annular bands or rings 58 and 59 are secured to the opposite faces of the cam disc 48 concentrically therewith, and one of these rings, for instance the outer one 58, is of insulating material. A series of equally spaced contacts 60, equal in number to the lugs 49, are inserted through the rings 58 and 59 and the cam disc, and are insulated from the latter by insulating collars 61 in a well known manner. All of these contacts, however, make electrical connection with the ring 59, as will be understood. A brush 62 is supported from the frame bar 25 in position to ride this ring 59 as the machine operates, and a similar brush 63 is supported by a bracket 64 from said bar to successively engage the contacts 60, making an electrical connection between the brushes as each contact passes. One side of the supply circuit to the solenoid 56 is led to the solenoid with the brushes 62—63 in series so that the commutator action of the contacts 60 will control the closing of this circuit. The wires associated with these parts are represented generally at 65.

The arms 42 carrying the fingers 41 are insulated from the shafts 44 and 45 by insulating bushings within the clamps 43 in well known manner, and the other side of the solenoid supply circuit is arranged with these arms 42 and fingers 41 in series so that the circuit will be closed only when one of the plates P is at rest on the fingers. The wires associated with this circuit are designated generally at 66.

In operation then, two conditions determine the lowering of the plates to the carrier wheels, one being the proper position of the notches 16 for receiving the plate, as regulated by the brushes 62—63, and contacts 60, and the other being the proper positioning of a plate in the fingers 41. In other words, both of these requirements must be met, and if so then the solenoid 56 will be energized, the latch 52 pulled clear of the arm 53, and the shaft 45 released, allowing the arms 42 to lower and drop the lugs L of the plate upon the wheels 14. As this operation takes place the roller 51 drops sharply off a cam lug 49 into the space between lugs and lowers the plate as described. Then as the plate leaves the fingers 41 and the contact between brushes 62—63 is broken by rotation of the cam, the solenoid is de-energized and the inclined leading face 67 of the next lug raises the arms 42 again to position for receiving the next plate from the conveyor 40 and the latch 52, freed of the pull of the solenoid, may again slip beneath the arm 53 to lock the parts until an operative condition again exists.

It may be pointed out that the action of the brush and contact assembly or commutator mechanism allows sufficient precision in control to insure that the latch will release at the exact moment a cam lug 49 is in position to engage the roller, thus allowing the roller to drop and deposit the plate at the desired time and irrespective of the rate of feed of the plates from the conveyor 40. At the same time the "plate control" of the system prevents needless operation of the parts such as might occur otherwise when for one reason or another no plates should be fed to the fingers 41. The fingers 41 are of course electrically connected to the arms 42 and to improve the contact between the plates and fingers the portion of the latter engaged by the lugs L may be coated with silver or similar material.

As the plates P are thus deposited or suspended in the carrier 12 they will move forwardly therewith, hanging vertically and edgewise from their lugs, until they are finally lowered into the liquid near the center of the tank. The plates must then be transferred to the next, or output carrier 13, and this transfer must obviously take place only after the plates have been fully immersed in the liquid. For this purpose we provide transfer slides 68 at each side and outwardly of the wheels 14 and which are disposed in forwardly and downwardly inclined positions bridging the gap at the point at which the respective wheels of the carriers 12 and 13 most closely approach each other. This point is, of course, substantially in horizontal alignment with the axles 15 and is well below the normal liquid level in the tank, as clearly shown in Fig. 3. The slides 68 are thus so located that, as the plates P suspended in carrier 12 reach this point their lugs L will engage the slides and will by the angularity thereof be moved of their own weight clear of this carrier and will slide over into engagement with the notches 16 in the wheels of the output carrier 13. The latter is of course so timed with respect to carrier 12 that the notches will properly receive the plates as they move off the slides. The plates will then be carried upwardly out of the liquid, and as they move along the upper part of their travel excess liquid may drain back into the tank.

The transfer slides 68 are secured tangentially to short stub shafts 69 which are adjustably mounted in bearings 70 on the upper margins of the tank sides and minor adjustments of the position and angle of the slides may thus be made.

Due to the forward motion of the plates as their lower edges enter the liquid they would tend to swing backwardly and such action would very possibly dislodge the plates or interfere with their transfer between carriers. To avoid this action guide wings 71 are secured as shown to the mounting portions of the slides 68 and extend outwardly to provide an arcuate portion 72 overlying the wheels 14 of the input carrier in a position such that the upper edges of the plates will slide beneath this portion as their lower edges enter the liquid in the tank. Also, an arcuate guide member 73 is supported in the tank in a position to engage and guide the lower edges of the plates as they enter the liquid and until the transfer between wheels take place. These parts thus mutually support and guide the plates, as clearly evident in Fig. 3, so that they retain their vertical position. For the guide member 73 we prefer to employ a rubber or rubber-like material since it will become glazed in use and will offer little or no frictional resistance to the plates. The member is curved to the desired shape and is supported by bolts 74 from a transverse upstanding lead partition 75.

The plates carried by output carrier 13 are transferred to smaller discharge discs 76 near the discharge end of the machine, and these discs have notches 77 for supporting the plates by their lugs in the manner heretofore described. It will be noted that these discs 76 marginally overlap the wheels 14 on the inner sides of the latter and the transfer between wheels and discs is thus made directly, assuming that the discs rotate at proper speed to insure that a notch 77 will be in proper position to receive each plate. For this purpose the discs 76 are rotated by means of a countershaft 78 journaled in bearing brackets 79 at the end of the tank and which is driven by a sprocket chain 80 trained over a sprocket 81 on this shaft and notches 82 on the drive shaft 23. The shafts 83 of the discs 76 are journaled in bearings 84 mounted on the upper margins of the tank sides and carry sprockets 85 in line with similar sprockets 86 on the countershaft 78 for connection thereto by means of sprocket chains 87. Short transfer slides 88 may, however, be provided in alignment with the transfer point between the wheels and the discs and when properly inclined will guide the lugs of the plates into engagement with the discs as they leave the wheels. Like the aforesaid slides 68, these members 88 are also adjustably supported by shafts 89 mounted in bearing brackets 90 on the upper edge of the tank.

The oven conveyor 91 is of the same type as conveyor 40, and receives the plates directly from the discharge discs 76 for transfer to the oven (not shown).

It is thought that the operation of the entire machine will be understood from the foregoing disclosure, and it will be evident that the plates may be fed through the machine in a rapid, continuous stream and that each will be entirely immersed in the bath provided by the bonding liquid in the tank A. Furthermore, it will be noted that the operation will be entirely automatic and will require no attention over long periods of time, aside from lubrication and replenishment of the liquid.

The length of time during which the plates are subjected to the action of the acid is often important and in some cases will need to be varied in accordance with the particular oxide ingredients used. The present machine will obviously dip all plates exactly the same amount and the time of immersion may be readily varied by varying the speed of the machine.

The dipping devices, gears and all other parts subject to action of the acid are made of some acid-resisting alloy.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A dipping mechanism for battery grid plates comprising dipping devices for receiving and dipping the plates, a conveyor for conveying plates in succession to the mechanism, a transfer device including spaced elements for receiving the plates therebetween and for transferring the plates to the dipping devices, locking means normally locking the plate transfer device against movement, electrically operating means for disabling said locking means and rendering the transfer device effective, and the said receiving elements of the transfer device being connected in circuit with said electrically operating means for closing said circuit through the plates as they rest in said elements.

2. In a dipping mechanism for storage battery grid plates, a conveyor carrying the plates to the mechanism, dipping elements for receiving the plates in succession and performing the dipping operation thereon, means for transferring the plates from conveyor to dipping elements, locking means normally holding the transfer means in position for receiving the plates from the conveyor, electrically operated means for disabling the said locking means and rendering the transfer means effective, and control means including a circuit interrupting mechanism operating in predetermined synchronism with the dipping elements, and connected in circuit with the said disabling means for controlling the operation of the transfer means in accordance with position of the dipping elements.

3. In a dipping mechanism for storage battery grid plates, a conveyor carrying the plates to the mechanism, dipping elements for receiving the plates in succession and dipping the same, transfer means for transferring the plates one at a time from conveyor to dipping elements, electrically operated control means connected with the transfer means and controlling the operation thereof according to receiving condition of the dipping elements, the said control means including contact elements on the transfer means adapted to be electrically bridged by the plates and connected in circuit with the control means, and a circuit controlling mechanism operating in definite relation to the dipping devices and also connected in circuit with the control means, whereby the transfer means will be rendered effective only when a plate is resting therein and the dipping elements are in condition for receiving the said plate.

4. A mechanism for handling storage battery grid plates, comprising spaced rotary members having marginal notches for suspending the plates by their end lugs, transfer means including spaced finger members movable in vertical planes for supporting the plates by their lugs and lowering the plates to engage their lugs with the notches, and electrically energized control means for lowering the finger members, the said control means being operative only under conditions in which at least one plate is in position in the transfer means and the rotary members are in position to receive the plate in their marginal notches.

5. A mechanism for operating upon flat articles having lugs extended from their ends, comprising rotary carrier devices each including spaced wheel members having marginal notches adapted to receive and suspend the articles by their lugs, the said carrier devices being mounted with the respective wheel members operating in edge to edge relation, means for initially depositing the articles on one carrier member and for discharging them from the other, and means for transferring plates from the downwardly moving side of one carrier member to the upwardly moving side of the other.

6. A mechanism for handling plates of a type having lugs extended from their ends, comprising a pair of rotary carrier members each including spaced discs having marginal means for suspending the plates by their lugs, the said carrier members being supported with their axes substantially parallel and their respective discs in edge to edge alignment, and means for transferring the plates from the downwardly moving side of one carrier member to the upwardly moving side of the other, the said means comprising inclined slide members supported in position for engaging the plate lugs and guiding the same between the respective discs of the carrier members.

7. In a dipping and bonding mechanism for storage battery grid plates, a tank containing the bonding liquid, a pair of carrier devices mounted in the tank and each including spaced wheel members having marginal notches for suspending the plates by their lugs, means for rotating the carrier members for immersing the plates in the liquid in the tank and withdrawing the plates therefrom, and transfer means for transferring the plates from one carrier member to the other below the level of the liquid in the tank.

8. In a dipping mechanism for storage battery grid plates, a tank containing the dipping liquid, a carrier member mounted in the tank and including spaced circular members having marginal notches for suspending the plates by their end lugs, means for rotating the carrier member and dipping the plates carried thereby into the liquid in the tank, means for guiding the plates and resisting the tendency of the plates to oscillate on the carrier member as they enter the liquid, and means for withdrawing the plates from the tank.

9. In a dipping mechanism for storage battery grid plates, a tank containing the dipping liquid, a rotary carrier member for suspending the plates by their lugs and lowering them into the liquid, another rotary carrier member arranged adjacent the first for engaging and withdrawing the plates from the tank, means for guiding the plates as they enter the liquid and overcoming the resistance of the liquid to the travel of the plates, and means for transferring the plates from one carrier member to the other.

10. In a machine for operating upon storage battery grid plates, the combination with a conveyor means for the plates, of a transport member, a transfer device for engaging said plates at their opposite ends and transferring the plates from the conveyor means to the transport member, means normally restraining operation of the transfer device, and control means, operating in response to the presence of a plate in said transfer device, for releasing said restraining means.

11. In a machine for operating upon storage battery grid plates, the combination with a conveyor means for the plates, of a transport member, a transfer device for engaging said plates at their opposite ends and transferring the plates from the conveyor means to the transport member, means normally restraining operation of the transfer device, and control means responsive to and controlled by position of the transport member and the presence of a plate in said transfer device, for rendering said restraining means inoperative.

12. A dipping mechanism for battery grid plates comprising dipping devices for receiving and dipping the plates, a conveyor for conveying plates in succession to the mechanism, a transfer device including spaced elements for receiving the plates therebetween and for transferring the plates to the dipping devices, locking means normally locking the plate transfer device against movement, and electrically controlled means for disabling the said locking means and rendering said transfer device effective for transferring the plates to the dipping devices.

13. In a dipping mechanism for storage battery grid plates, a tank containing the dipping liquid, a rotary carrier member for suspending the plates by their lugs and lowering them into the dipping liquid, means for withdrawing the plates from the liquid, and guide means engaging the lugs of the plates for preventing dislodgement of the plates as they are dipped into the liquid.

14. In a dipping mechanism for storage battery grid plates, a tank containing the dipping liquid, a rotary carrier member for suspending the plates by their lugs and lowering them into the dipping liquid, means for withdrawing the plates from the liquid, and means in the tank for engaging and guiding the lower margins of the plates as they enter the liquid.

CARL L. FELDTKELLER.
ARTHUR D. LUND.